Jan. 2, 1962 H. F. HERBIG ET AL 3,015,696

TRANSISTOR OSCILLATORS

Filed Jan. 8, 1957

Inventors
HENRY F. HERBIG
EDWARD R. SCHMIDT
By Bernard E. Franz
Attorney

United States Patent Office 3,015,696

Patented Jan. 2, 1962

3,015,696
TRANSISTOR OSCILLATORS

Henry F. Herbig, Smoke Rise, N.J., and Edward R. Schmidt, Rochester, N.Y., assignors to International Telephone and Telegraph Corporation, Nutley, N.J., a corporation of Maryland Filed Jan. 8, 1957, Ser. No. 633,066
16 Claims. (Cl. 179—17)

Figures 1, 2:
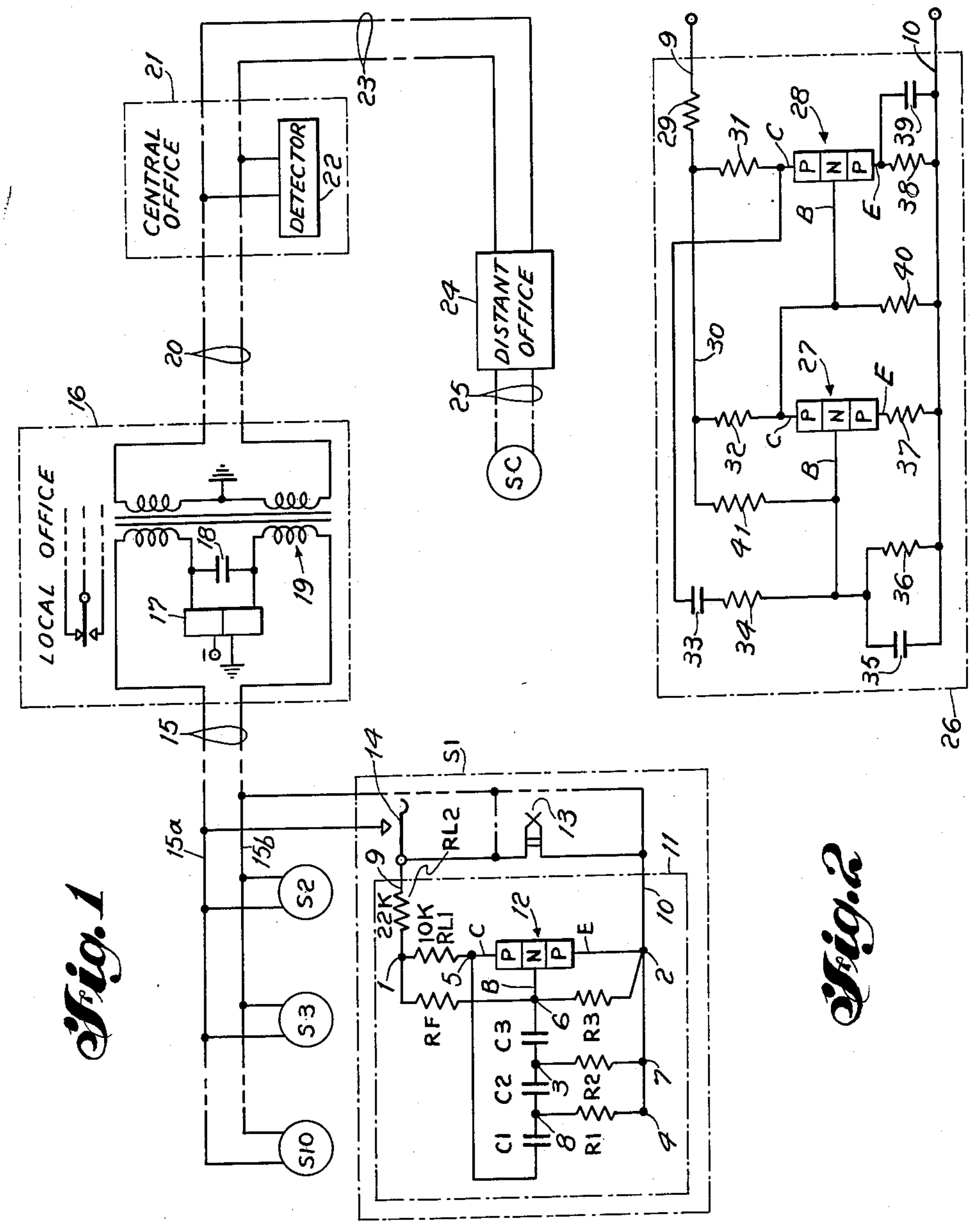

This invention relates to a transistor oscillator and more particularly to an oscillator for use in a telephone sub-station to identify the subscriber on a party line. The principal object of this invention is to provide an oscillator which is inexpensive, stable and dependable over a wide temperature range with output in the voice frequency range.

A pending U.S. patent application by William Hatton for a "Party Line Identification System," Serial No. 451,791, filed August 24, 1954, now U.S. Patent No. 2,889,410, discloses a system using transistor oscillators at party line stations. That and other prior attempts to produce an oscillator for use in a telephone subset resulted in arrangements which were too expensive, too bulky, unstable, or otherwise undependable. Usually the output was transformer coupled to the line, with a separate D.C. supply path from the line. The size could be reduced, and the performance improved by using an oscillator without inductors, the frequency being determined by an RC circuit of a type having few components.

However, one difficulty is that characteristics vary considerably among transistors of the same type, and with changes in temperature. $I_{co}$, the D.C. collector current when the emitter current $I_e$ is zero, is particularly affected by such changes. The quiescent collector current ($I_c$) varies directly with $I_{co}$, causing an undesirable change in the operating point of the circuit. Various arrangements for establishing and stabilizing the D.C. bias of transistor circuits have been proposed. See, for example, R. F. Shea, "Transistor Circuits" (Wiley, 1953), chapters 6 and 8; Lo, Endres, Zawkls, Waldhaur, and Cheng, "Transistor Electronics" (Prentice-Hall, 1955), chapter 4; and a pending U.S. patent application by Bernard Cooper and Fred A. Muller for a "Temperature Compensated Transistor Circuit," Serial No. 552,664, filed December 12, 1955, now abandoned. A problem arises because increasing the bias stabilization reduces the gain. In some cases the operating point cannot be determined independently of the stabilization. For example, in the common emitter configuration, connecting a resistor in series with the emitter terminal to provide stabilization reduces the gain considerably. The Lo et al. references discloses two bias arrangements in which a bias resistor is connected from the base to one end of the load resistor in the collector circuit, (1) fixed bias, with the bias resistor connected directly to the D.C. source and (2) self-bias, with the bias resistor connected directly to the collector terminal. The fixed bias arrangement has high gain, but the quiescent collector current $I_c$ is unstable. The self-bias arrangement has a large amount of feedback, both D.C. and A.C., which gives a relatively stable value for $I_c$, but reduces the gain considerably.

According to the invention, an oscillator is provided using a common-emitter transistor stage with a phase-shifting feedback arrangement between the collector output and the emitter input. A feedback bias resistor is connected from the base terminal to a tap of the load resistance to provide adequate gain and stability. The operating point is determined by the relative values of the feedback resistor and the base-to-emitter resistor. The phase-shifting arrangement preferably comprises a resistance-capacitance network.

According to a further feature of the invention, high-tolerance, standard-value resistors and condensors with nominal values determined for the desired frequency are used in the phase-shift network, and the frequency is trimmed to a close tolerance by using a value for the feedback resistor as determined experimentally.

Another feature relates to the arrangement using only two leads to connect the oscillator in the telephone circuit, across the dial-pulsing contacts, for party identification. The load resistance is connected from the collector terminal to one lead, and the emitter terminal is connected to the other lead. When the pulsing contacts open, oscillator D.C. supply current and A.C. output current flow through the same pair of leads.

In the preferred form of the invention, the required phase shift is provided by an RC network, with series connected condensers between the collector and base terminals, and shunt connected resistors from the respective condenser junctions and the base terminal to the emitter terminal.

According to an alternative form of the invention, the oscillator is of the Wien bridge type, with an additional transistor input stage having its base terminal connected by a resistor and capacitor in series to the output stage and by a resistor and capacitor in shunt to ground.

The above-mentioned and other features and objects of this invention will become more apparent by reference to the following description taken in conjunction with the accompanying drawings, in which:

FIG. 1 shows a telephone system with a subscriber identification arrangement; and FIG. 2 is a schematic diagram of an alternate oscillator circuit.

Referring to FIG. 1, the invention is disclosed in a telephone system in which an oscillator at each station on a line transmits a tone during dialing to identify the station in a detector at a central office, when making a toll call. A party line 15 is shown as having stations S1 to S10 with connection to a local office 16. Office 16 includes equipment for making a connection to a trunk 20 which extends to a central office 21. The connecting equipment includes a repeat coil 19 for coupling A.C. signals. The primary of the repeat coil 19 is split and connected through respective windings of a line relay 17 to negative and ground terminals of a common battery to supply D.C. current to line 15. The relay is bypassed for A.C. signals by a condenser 18.

The station S1 includes the usual telephone subset equipment of which only one set of hookswitch contacts and the dial pulsing contacts are shown. In addition an oscillator 11 is included, which is connected by leads 9 and 10 directly across dial pulsing contacts 13. It should be noted that this connection differs from prior arrangements in that no transformer is used to couple the oscillator to the line 15, and only two leads are used which serve to both carry D.C. current to the oscillator and couple A.C. output to the line.

Normally when station S1 is in use, hookswitch contacts 14 being closed, the oscillator is short-circuited by contacts 13. Whenever the dial is operated, and contacts 13 open for each pulse, the D.C. current is interrupted in the usual manner to release and reoperate the relay 17. Simultaneously during each D.C. interruption oscillator 11 operates to transmit an A.C. signal, which is transmitted over line 15, through repeat coil 19 and other connecting apparatus in office 16, over trunk 20 to central office 21. The D.C. pulses are repeated at office 16 to trunk 20 by the contacts of relay 17 and other apparatus not shown. A connection is made to another line and a station signalled according to the D.C. pulses. If a toll call is made, the connection may be completed over a toll trunk 23 and a distant office 24 to the called line 25, and the station SC signalled. The calling-party identifying tone is detected by detector apparatus 22, which may include party identification equipment similar to that shown in the Hatton application. Each of the stations S1 to S10 includes a similar oscillator, each having a separate frequency in the voice range.

Oscillator 11 includes a junction transistor 12 with a phase-shift network comprising condensers C1, C2 and C3 in series between the collector and base terminals and shunt resistors R1, R2 and R3 connected respectively from the condenser-junction points and the transistor base terminal to the emitter terminal. Vacuum-tube oscillators using phase-shift networks of this type are disclosed in an article by E. L. Ginzton and L. M. Hollingsworth, "Phase-Shift Oscillators," the Proceedings of the I.R.E., vol. 29, February 1941, pages 43–49; and in a U.S. Patent to H. W. Nichols, No. 1,442,781.

A load resistance comprising resistors RL1 and RL2 in series is connected from the collector terminal C to lead 9, and the emitter terminal F is connected to lead 10. From point 1 at the junction of resistors RL1 and RL2 a feedback resistor RF is connected to the base terminal B. For proper operation of the oscillator, it is necessary to establish a proper bias point, to stabilize the bias, and to have sufficient gain for oscillation. The bias point is determined by the relative values of resistor RF and the resistance which includes resistor R3 between the base and the emitter terminals. It can be shown by the methods disclosed in the Shea and in the Lo et al. references that the stabilization, defined as a factor S which is the rate of change of $I_c$ with $I_{co}$, is approximately equal to $$1+\frac{RL2}{RF}$$

The feedback, which reduces the gain, depends upon the ratio of RL2 to the total load resistance. It can be seen that adjusting the component values to improve some of these factors will make others worse. According to the invention, component values have been determined which simultaneously give satisfactory results for all three factors. With a 48-volt battery supplying current through relay 17 over line 15 to this oscillator, resistor RL2 may have a value of 22,000 ohms and resistor RL1, 10,000 ohms. Transistor 12 is Texas Instrument's type TI2N185. The other component values depend upon frequency. If condensers C1, C2 and C3 are equal and resistors R1, R2 and R3 are equal, their theoretical values, assuming no loading of the phase-shift network, are calculated according to the formula $$f=\frac{1}{2\pi RC\sqrt{6}}$$

where $f$ is the frequency, R is the resistance of each of the resistors R1 to R3 and C is the capacitance of each of the condensers C1 to C3. It has been determined empirically that $f$ should be approximately .05/RC. The values used are shown in the following table.

| No. | Freq. c.p.s. | R1, R2, R3, ohms | C1, C2, C3, microfarads |
|---|---|---|---|
| 1 | 3,000 | 6,800 | .002 |
| 2 | 2,300 | 9,100 | .002 |
| 3 | 1,700 | 5,600 | .005 |
| 4 | 1,300 | 8,200 | .005 |
| 5 | 960 | 4,700 | .01 |
| 6 | 730 | 6,800 | .01 |
| 7 | 560 | 9,100 | .01 |
| 8 | 400 | 12,000 | .01 |
| 9 | 250 | 10,000 | .02 |
| 10 | 150 | 6,800 | .04 |

It has been found that all these resistors may be standard ½ watt with 5% tolerance and the condensers may be standard units with 10% tolerance. The frequency may be adjusted to within ±2% by inserting a potentiometer in the circuit in place of resistor RF, adjusting the potentiometer to obtain the desired frequency, reading the resistance value, and then inserting a standard value resistor in place of the potentiometer. The following standard values have been used: 0.82, 0.91, 1, 1.2, 1.5, 1.8, 2.2, 2.7, and 3.3 megohms. Additional intermediate standard values can be obtained if found necessary. Prior to shipment to the field, an additional frequency check should be made. The maximum allowable tolerance is ±4% for the finished oscillator. It has been found that with the specified variation of resistor RF there is sufficient output voltage, which should be no less than 0.14 volt across 600 ohms. The battery voltage at the office 16 may vary from 46 to 52 volts with sufficient output and satisfactory operation.

This oscillator has many additional advantageous features. The large resistor in series with the line makes variation in line impedance negligible, and loading on the line by the oscillator is negligible. The relays 17 will follow pulses satisfactorily on a line having a leakage resistance of 15,000 ohms or higher. The oscillator triggers and builds up oscillation rapidly. There is no inductive delay in the build up, since no transformer or other inductor is used. The positive or negative side of the battery may be grounded, by using a PNP or NPN transistor respectively. Here transistor 12 is shown as a PNP type with the positive terminal of the battery grounded.

The phase-shift network may have four or more RC sections, instead of three as shown, to reduce the gain required in the transistor 12, which may then be a type 2N44.

An article by P. G. Sulzer, the "Tapered Phase-Shift Oscillator," Proceedings of the I.R.E., vol. 36, October 1948, pages 1302–1305, describes a method for reducing the attenuation in a phase-shift network by tapering the component values to match the output and input impedances. The results given in that article are for matching the low impedance output of a vacuum tube to its high impedance input. It has been found that for a transistor, which has a high-impedance output and a low-impedance input, the formula should be reversed so that C1 has a value of $C/a^2$, C2 is $C/a$, C3 is C, R1 is $a^2R$, R2 is $a$R and R3 is R, where $a$ is a constant determined according to the methods described in the article. With this arrangement, the required gain may be reduced considerably.

The Wien bridge oscillator 26 shown in FIG. 2 may be connected to wires 9 and 10 in place of oscillator 11 in the system of FIG. 1. Two junction transistors 27 and 28, which may be type 2N44, are direct coupled. The load resistance includes a common resistor 29 connected between wire 9 and wire 30. From wire 30 a resistor 31 is connected to the collector terminal of the output of transistor 28, and resistor 32 is connected to the collector of the input transistor 27. A resistance-capacitance network comprising a condenser 33 and resistor 34 in series from the collector terminal of transistor 28 to the base terminal of transistor 27, and a condenser 35 and resistor 36 in shunt from the base of transistor 27 to the common wire 10 provide regenerative feedback and determine the frequency. A resistor 37 is connected from the emitter terminal of transistor 27 to wire 10 which controls the output waveform. A resistor 38, connected from the emitter terminal of transistor 28 to wire 10, limits the D.C. current and establishes a good bias point. This resistor is bypassed by a large condenser 39. The collector terminal of transistor 27 is connected to the base terminal of transistor 28, with a resistor 40 connected to the common wire 10. Feedback resistor 41, connected from wire 30 to the base terminal of transistor 27, may have a value determined experimentally to trim the frequency to within a low tolerance of the desired value. D.C. bias current is received from, and A.C. output transmitted to, wires 9 and 10, as for oscillator 11 in FIG. 1. With a 48-volt battery at the office 16, this oscillator produces a 4-volt signal across the 600-ohm load. This oscillator is also easy to stabilize and control.

While we have described above the principles of our invention in connection with specific apparatus, it is to be clearly understood that this description is made only by way of example and not as a limitation to the scope of our invention as set forth in the objects thereof and in the accompanying claims.

We claim:

1. A transistor phase shift oscillator comprising a two-terminal load having a source of direct current bias and means to simultaneously connect said bias source to one of said terminals and extract oscillations from said oscillator, a transistor having emitter, base and collector electrodes, a load resistance, means directly connecting said load resistance between said collector electrode and said one terminal, means to directly connect the other terminal of said load to said emitter electrode to dispose said load in a shunt relation with said transistor, a non-inductive phase-shifting means, means directly connecting said phase-shifting means between the collector-to-emitter output and base-to-emitter input of said transistor, and a feedback resistor directly connected between a given point on said load resistance and said base electrode.

2. A transistor phase-shift oscillator according to claim 1, wherein said load resistance comprises a first resistor connecting said collector electrode to said given point and a second resistor connected between said given point and said one of said terminals.

3. A transistor phase-shift oscillator according to claim 1, wherein the value of said feedback resistor may be varied to vary the frequency of said output signals over a substantial range while maintaining favorable stability, amplification, and output level.

4. An oscillator according to claim 1, wherein said phase-shifting means comprises a resistance-capacitance network.

5. An oscillator for transmitting A.C. signals of a given frequency over an associated two-conductor line while receiving its D.C. supply power from said line, said oscillator comprising a transistor having emitter, base and collector electrodes, a phase-shifting network coupled to said electrodes including a plurality of series connected capacitors and a plurality of shunt connected resistors, one terminal of the first of said capacitors being directly connected to said collector electrode, one terminal of the last of said capacitors and one terminal of the last of said resistors being directly connected to said base electrode, all but the last of said resistors having one terminal directly connected between successive capacitors, the remaining terminal of each of said resistors being directly connected to said emitter electrode, load resistance means having one terminal directly connected to said collector electrode, means for connecting one conductor of said line to the remaining terminal of said load resistance means and the other conductor of said line to said emitter electrode, and a feedback resistor directly connected between a point on said load resistance means and said base electrode.

6. An oscillator for transmitting A.C. signals of a given frequency over an associated two-conductor line while receiving its D.C. supply power from said line, said oscillator comprising a transistor having emitter, base and collector electrodes, a phase-shifting network coupled to said electrodes including a plurality of series connected capacitors and a plurality of shunt connected resistors, one terminal of the first of said capacitors being connected to said collector terminal, one terminal of the last of said capacitors and one terminal of the last of said resistors being connected to said base terminal, all but the last of said resistors having one terminal connected between successive capacitors, the remaining terminal of each of said resistors being connected to said emitter terminal, load resistance means having one terminal connected to said collector terminal, means for connecting one conductor of said line to the remaining terminal of said load resistance means and the other conductor of said line to said emitter terminal, and a feedback resistor connected between a point on said load resistance means and said base terminal, the portion of said load resistance between said collector electrode and said point having a nominal value of 10,000 ohms, the portion of said load resistance between said point and said one conductor of said line having a value of 22,000 ohms, the said plurality of capacitors comprising three capacitors of equal nominal values in the range of 0.002 to 0.04 microfarad and said plurality of shunt connected resistors comprising three resistors of equal nominal values in the range of 4,700 to 12,000 ohms depending upon the assigned frequency, and said feedback resistor having a value between 0.8 and 3.5 megohms.

7. An oscillator for transmitting A.C. signals of a given frequency over an associated two-conductor line while receiving its D.C. supply power from said line, said oscillator comprising a transistor having emitter, base and collector electrodes, a phase-shifting network coupled to said electrodes including a plurality of series connected capacitors and a plurality of shunt connected resistors, one terminal of the first of said capacitors being connected to said collector terminal, one terminal of the last of said capacitors and one terminal of the last of said resistors being connected to said base terminal, all but the last of said resistors having one terminal connected between successive capacitors, the remaining terminal of each of said resistors being connected to said emitter terminal, load resistance means having one terminal connected to said collector terminal, means for connecting one conductor of said line to the remaining terminal of said load resistance means and the other conductor of said line to said emitter terminal, and a feedback resistor connected between a point on said load resistance means and said base terminal, said transistor being a PNP junction type.

8. An oscillator for transmitting A.C. signals of a given frequency over an associated two-conductor line while receiving its D.C. supply power from said line, said oscillator comprising a transistor having emitter, base and collector electrodes, a phase-shifting network coupled to said electrodes including a plurality of series connected capacitors and a plurality of shunt connected resistors, one terminal of the first of said capacitors being connected to said collector terminal, one terminal of the last of said capacitors and one terminal of the last of said resistors being connected to said base terminal, all but the last of said resistors having one terminal connected between successive capacitors, the remaining terminal of each of said resistors being connected to said emitter terminal, load resistance means having one terminal connected to said collector terminal, means for connecting one conductor of said line to the remaining terminal of said load resistance means and the other conductor of said line to said emitter terminal, and a feedback resistor connected between a point on said load resistance means and said base terminal, said resistors and capacitors having standard values with tolerances substantially higher than the desired tolerance of said given frequency, and the said feedback resistor having a standard value determined experimentally to produce output at a frequency within a low tolerance of said given frequency.

9. An oscillator according to claim 8, wherein said resistors have a tolerance of $\pm5\%$, said capacitors have a tolerance of $\pm10\%$, all said capacitors and resistors except said feedback resistors have standard nominal values assigned according to the desired frequency, and said feedback resistor has a standard value at which said oscillator has an output frequency within $\pm2\%$ of said assigned frequency.

10. An oscillator according to claim 9, wherein the portion of said load resistance between said collector and said point has a nominal value of 10,000 ohms, the portion of said load resistance between said point and said one conductor of said line has a nominal value of 22,000 ohms, the said plurality of capacitors comprises three capacitors of equal nominal values in the range of 0.002 to 0.04 microfarad and said plurality of shunt connected resistors comprises three resistors of equal nominal values in the range of 4,700 to 12,000 ohms depending upon the assigned frequency, and said feedback resistor has a value between 0.8 and 3.5 megohms.

11. An oscillator according to claim 10, in which the output level to a 600-ohm load is at least 0.14 volt, when the D.C. voltage supplied to said line is in the range of 46 to 52 volts.

12. An oscillator for transmitting A.C. signals of a given frequency over an associated two-conductor line while receiving its D.C. supply power from said line, said oscillator comprising a transistor having emitter, base and collector electrodes, a phase-shifting network coupled to said electrodes including a plurality of series connected capacitors and a plurality of shunt connected resistors, one terminal of the first of said capacitors being connected to said collector terminal, one terminal of the last of said capacitors and one terminal of the last of said resistors being connected to said base terminal, all but the last of said resistors having one terminal connected between successive capacitors, the remaining terminal of each of said resistors being connected to said emitter terminal, load resistance means having one terminal connected to said collector terminal, means for connecting one conductor of said line to the remaining terminal of said load resistance means and the other conductor of said line to said emitter terminal, and a feedback resistor connected between a point on said load resistance means and said base terminal, the capacitors and resistors of said phase-shifting network from the collector to the base electrode having decreasing impedance values for matching the output and input impedances of said transistor, thereby reducing the attenuation in said network and the required gain in said transistor.

13. A telephone party line subscriber station having dial contacts adapted to be coupled for operation across a party line and an oscillator operable at a frequency assigned for identification of said station, said oscillator comprising a transistor having emitter, base and collector electrodes, a resistance-capacitance feedback network coupled between collector-to-emitter output and base-to-emitter input of said transistor for producing oscillation at said assigned frequency, a pair of connecting leads, load resistance means connected between said collector electrode and one lead of said pair, said emitter electrode being connected to the other lead of said pair, non-inductive means connecting said pair of leads across said dial contacts for coupling D.C. supply power from said line to said oscillator and for coupling A.C. output at said frequency from said oscillator to said line only when said contacts are opened to simultaneously transmit a D.C. circuit interruption pulse.

14. A telephone party line subscriber station according to claim 13, wherein said load resistance means has a value of resistance which is substantially higher than the leakage resistance of said line.

15. A telephone party line subscriber station according to claim 13, wherein said feedback network produces substantially zero phase shift, and a second transistor coupled between said feedback network and the first said transistor produces phase reversal.

16. A telephone party line subscriber station according to claim 15, wherein said second transistor has emitter, base and collector electrodes, the collector electrode of said second transistor being connected to the base electrode of said first transistor, the emitter electrode of said second transistor being connected to the second said lead of said pair, and said network comprises a resistor and a condenser in series connected between the collector electrode of said first transistor and the base electrode of said second transistor and a resistor and a capacitor in shunt connected between the said base electrode of said second transistor and said second lead of said pair.

References Cited in the file of this patent

UNITED STATES PATENTS

| | | |
|---|---|---|
| 2,745,960 | Griffith | May 15, 1956 |
| 2,751,501 | Eberhard | June 19, 1956 |
| 2,782,259 | Dimond | Feb. 19, 1957 |
| 2,889,410 | Hatton | June 2, 1959 |
| 2,966,553 | Wadsworth | Dec. 27, 1960 |